US006434337B1

(12) United States Patent
Misawa

(10) Patent No.: US 6,434,337 B1
(45) Date of Patent: Aug. 13, 2002

(54) WARNING DEVICE AND METHOD IN MULTIFUNCTION ELECTRONIC APPARATUS

(75) Inventor: Takeshi Misawa, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/628,007

(22) Filed: Jul. 28, 2000

(30) Foreign Application Priority Data

Jul. 28, 1999 (JP) .......................................... 11-212984

(51) Int. Cl.⁷ ............................. G03B 7/26; H04N 5/225
(52) U.S. Cl. ........................ 396/279; 396/303; 348/372; 358/909.1
(58) Field of Search ................................ 396/277, 278, 396/279, 280, 301, 429, 303; 348/231, 372; 358/906, 909.1

(56) References Cited

U.S. PATENT DOCUMENTS 4,525,055 A * 6/1985 Yoko ............................ 396/279
6,031,999 A * 2/2000 Ogawa ......................... 396/303

* cited by examiner

Primary Examiner—David M. Gray
Assistant Examiner—Rochelle Blackman

(57) ABSTRACT

In a digital still camera equipped with a DAP (Digital Audio Player), the camera is so adapted that the camera can be used in a camera mode even when battery voltage declines owing to use of the camera in the DAP mode. The number of images to be recorded in the camera mode is set and so is a warning voltage necessary to record images of the set number. If battery capacity declines owing to operation in the DAP mode and the battery voltage reaches the set warning voltage, the user is notified of the fact that if use in the DAP mode is continued, it will not be possible to record the set number of images. By ceasing to use the camera in the DAP mode, a further decline in the capacity of the battery can be prevented. This makes it possible to reserve enough battery capacity to carry out the recording of the set number of images.

10 Claims, 10 Drawing Sheets

*Fig. 11*

TURN OFF POWER SUPPLY TO GIVE PRIORITY TO CAMERA OPERATION (CAMERA OF 20 IMAGES) — 9

WARNING DEVICE AND METHOD IN MULTIFUNCTION ELECTRONIC APPARATUS

BACKGROUND OF THE INVENTION

1. Field of the Invention

This invention relates to a warning device and method in a multifunction electronic apparatus driven by a removable battery and capable of first and second processing.

2. Description of the Related Art

A portable, compact electronic apparatus generally is driven by a battery. When the battery voltage falls below a fixed voltage level, the electronic apparatus can no longer operate. Some of these electronic apparatus issue a warning if the battery voltage falls so low that the apparatus can no longer operate.

Multifunction electronic apparatus capable of executing processing of a plurality of types have been developed in recent years. For example, there is a multifunction electronic apparatus possessing two functions, namely the function of a portable information appliance and the function of a mobile telephone. In a multifunction electronic apparatus of this kind, power consumed for the mobile-telephone function is greater than that consumed for the function of the portable electronic appliance.

Occasions arise in which as a result of consumption of the battery, the mobile telephone cannot be made to function but the portable electronic appliance can. This is inconvenient when one desires to use the apparatus as a mobile telephone.

This problem is not limited to a multifunction electronic apparatus having the aforesaid two functions, namely the function of the portable electronic appliance and the function of the mobile telephone but applies also to other multifunction electronic apparatus such as one having the function of a digital camera and the function of a portable cassette tape recorder.

DISCLOSURE OF THE INVENTION

An object of the present invention is to prevent a situation in which when an attempt is made to use a desired function in a multifunction electronic apparatus, the function cannot be used owing to a decline in battery voltage.

According to the present invention, the foregoing object is attained by providing a warning device in a multifunction electronic apparatus driven by a removable battery and capable of first and second processing, comprising: a priority-processing setting unit for setting which processing of the first and second processing is to be given priority; a detection unit for detecting voltage of the battery; and a warning unit for issuing a warning in response to detection by the detection unit of the fact that the voltage of the battery is in the vicinity of a voltage at which execution of the priority processing set by the priority-processing setting unit is impossible.

The present invention provides also a method suited to the device described above. Specifically, in a warning device of a multifunction electronic apparatus driven by a removable battery and capable of first and second processing, there is provided a method comprising the steps of: setting which processing of the first and second processing is to be given priority; detecting power-supply voltage of the battery; and issuing a warning in response to detection of the fact that the voltage of the battery is in the vicinity of a voltage at which execution of the set priority processing is impossible.

In accordance with the present invention, whichever of the first or second processing is to be given priority is set and the power-supply voltage of the battery is detected. A warning is issued if it is detected that the battery voltage is in the proximity of a voltage (or has attained the voltage per se) at which it is not possible to execute the priority processing that has been set.

By being so warned, the user can ascertain that a state is near in which execution of the set priority processing will not be possible. The user can then replace the battery with a new battery as necessary in order to enable execution of the priority processing. Thus the multifunction electronic apparatus can be so maintained that execution of the priority processing will be possible.

Examples of the first and second processing are processing to provide the function of a portable electronic appliance, processing to provide the function of a digital camera, processing to provide the function of a cassette tape recorder, timepiece processing, GPS (Global Positioning System) processing and DAP (Digital Audio Player) processing.

The warning device may further be provided with a use-time setting unit for setting a use time for executing the priority processing set by the priority-processing setting unit. In this case the warning unit would issue the warning in response to detection by the detection unit of the fact that the battery voltage has attained a voltage in the vicinity of the power-supply voltage necessary for the length of time set by the use-time setting unit.

An arrangement may be adapted in which supply of power by the battery is halted in response to detection by the detection unit of the fact that the battery voltage has attained a voltage at which it is not possible to execute the priority processing set by the priority-processing setting unit. This makes it possible to suppress battery consumption.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 illustrates an example of text displayed on the display panel of the digital still camera.

DESCRIPTION OF THE PREFERRED EMBODIMENT

A preferred embodiment of the present invention will be described in detail with reference to the drawings.

Figure 1:
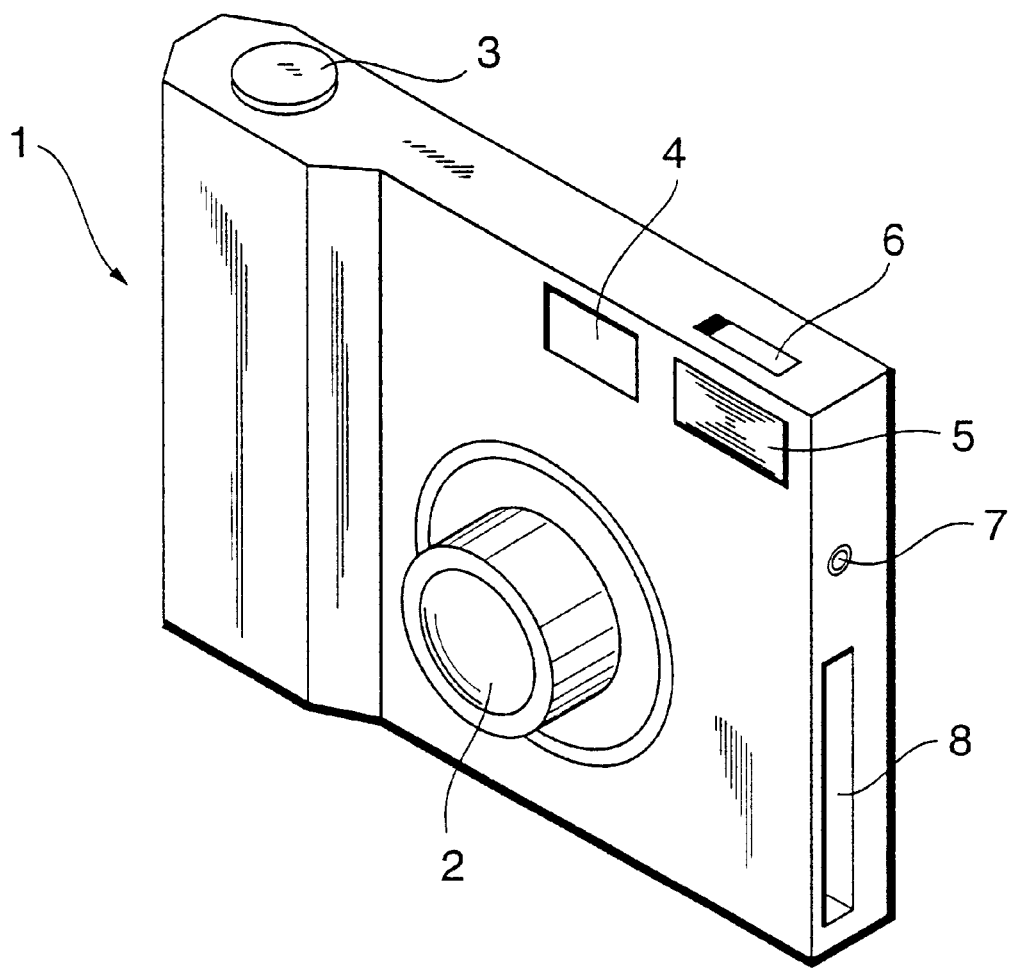
FIG. 1 is a perspective view showing a digital still camera as seen from the front thereof.

FIG. 1, which illustrates a preferred embodiment of the present invention, is a perspective view of a digital still camera 1, which is equipped with a DAP (Digital Audio Player), as seen from the front of the camera.

The digital still camera 1 with the DAP operates as a DAP in response to setting of the DAP mode and operates as a digital still camera in response to setting of the camera mode. The digital still camera with the DAP is driven by a removable battery.

The digital still camera 1 with the DAP is provided with an imaging lens 2 located on the front side of the camera substantially at the center thereof. An optical viewfinder 4 and a strobe 5 are provided on the front side of the camera 1 at the upper right thereof.

The top of the digital still camera 1 with the DAP is provided with a shutter-release button 3 on the left end thereof as seen from the front. The top of the camera 1 on the end thereof opposite the end having the shutter-release button 3 is provided with a switch 6 serving as both a power switch and a mode changeover switch. The power/mode switch 6 turns off the power supply of camera 1 and switches the camera between the camera mode and the DAP mode. The power supply of camera 1 is turned on by setting either the camera mode or DAP mode. The camera mode includes a playback mode and a photography mode.

The right side of the camera 1 as seen from the front is formed to have an earphone jack 7 and a slot 8 for inserting a memory card.

Figure 2:
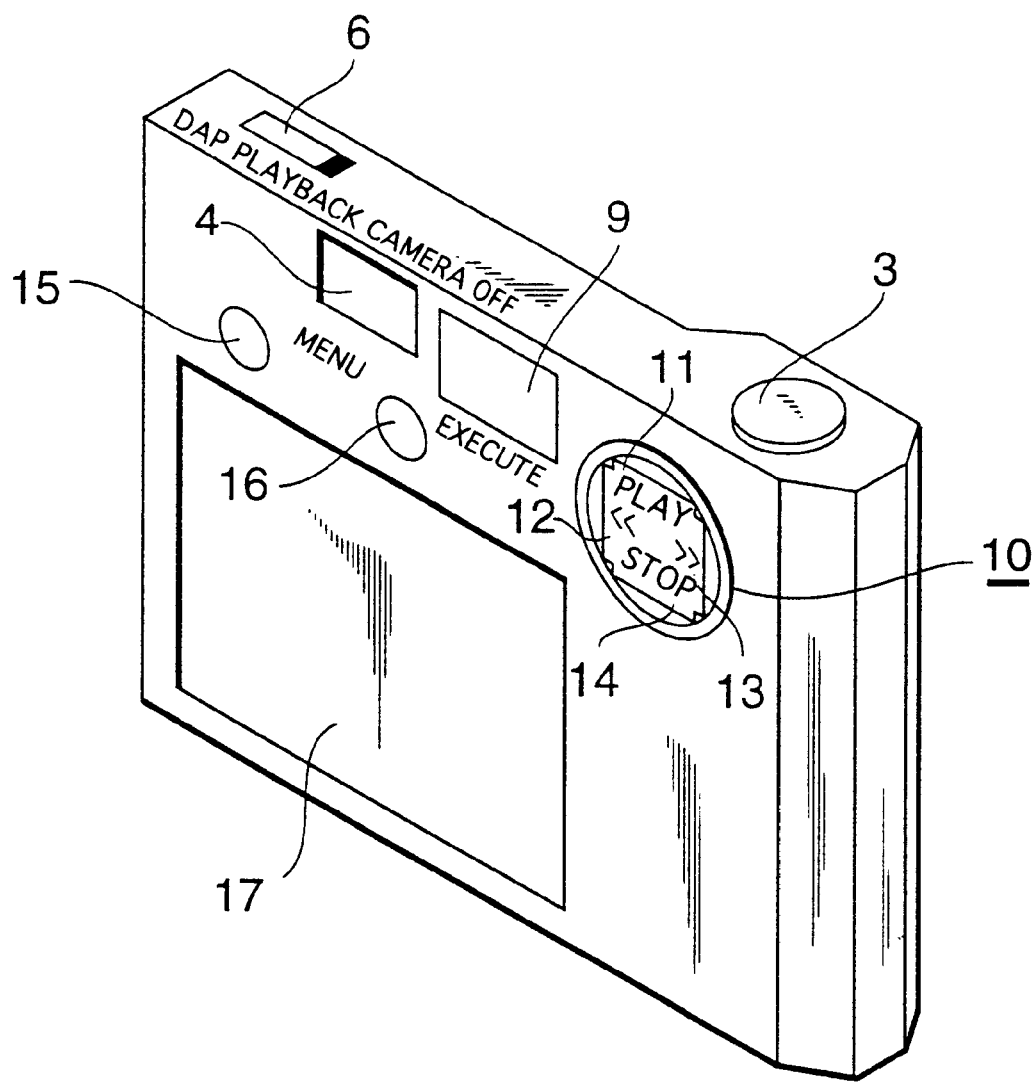
FIG. 2 is a perspective view showing a digital still camera as seen from the back thereof.

FIG. 2 is a perspective view of the digital still camera 1 with the DAP as seen from the front of the camera.

A display panel 9 for displaying a warning message is provided to the right of the optical viewfinder 4.

An operating switch 10 is provided to the right of display panel 9. The operating switch 10, which serves to supply the camera 1 with various commands in the DAP mode and various commands in the playback camera mode, is formed to include upper, lower, left and right portions 11, 14, 12, 13, respectively, that are capable of being pressed. Characters reading "PLAYBACK" are printed on the upper portion 11 of the operating switch 10. The upper portion 11 of the operating switch 10 is pressed by the user when a playback command is to be applied to the camera 1 in the DAP mode. Characters reading "STOP" are printed on the lower portion 14 of the operating switch 10. The lower portion 14 of the operating switch 10 is pressed by the user when a stop command is to be applied to the camera 1 in the DAP mode. A left arrow symbol is printed on the left portion 12 of the operating switch 10. The left portion 12 of the operating switch 10 is pressed by the user when a BACK command is to be applied to the camera 1 in the DAP mode and playback camera mode. A right arrow symbol is printed on the right portion 13 of the operating switch 10. The right portion 13 of the operating switch 10 is pressed by the user when a FORWARD command is to be applied to the camera 1 in the DAP mode and playback camera mode.

A display screen 17 for displaying an image is formed on the back side of the camera 1 substantially over the entire area thereof. A menu switch 15 and an execute switch 16 are provided above the display screen 17.

Figure 3:
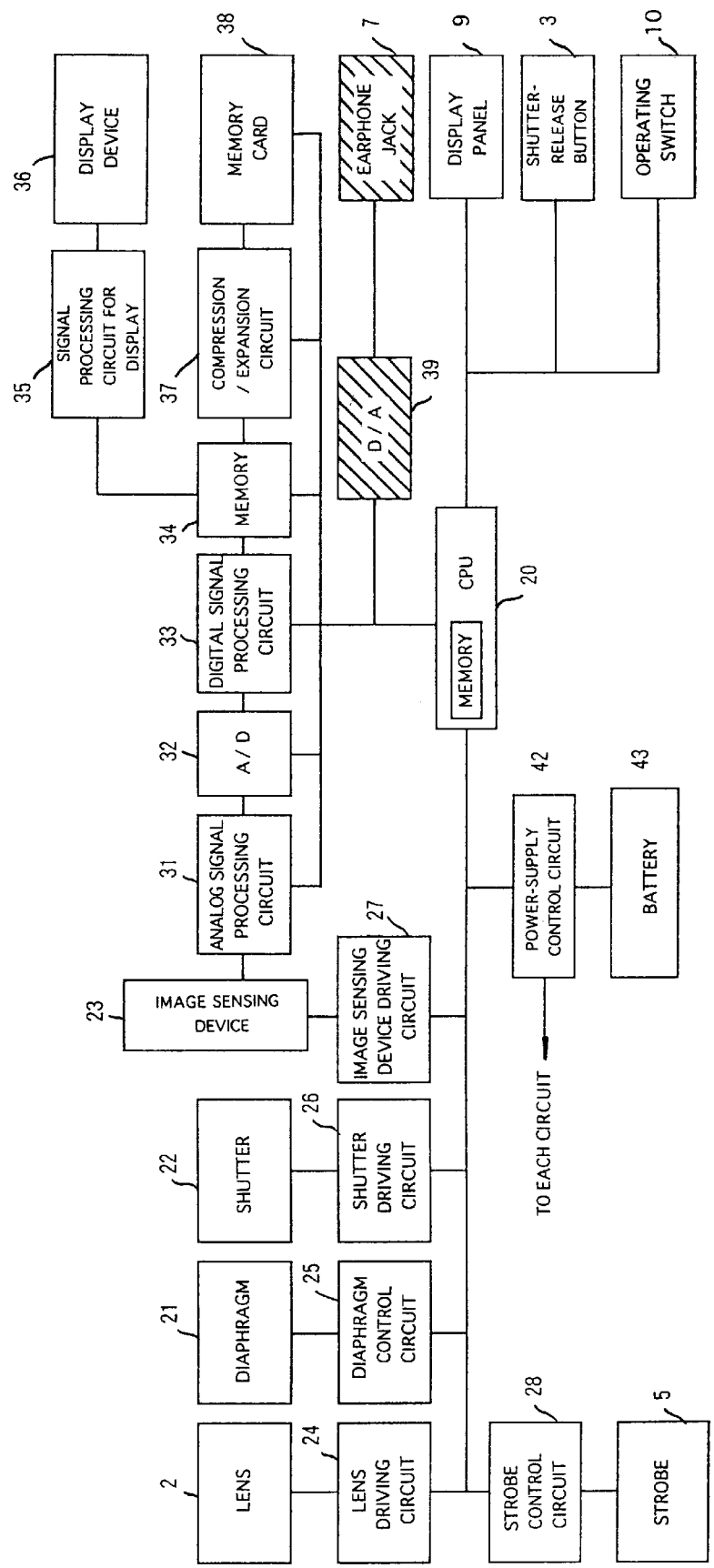
FIGS. 3 to 5 are block diagrams illustrating the electrical construction of the digital still camera.

FIG. 3 is a block diagram illustrating the electrical construction of the digital still camera 1 with the DAP.

The overall operation of the camera 1 is controlled by a CPU 20, which has an internal memory for storing data temporarily.

Voltage supplied from a removable battery 43 is applied to a power-supply control circuit 42. The power-supply control circuit 42 supplies power to each of the circuits that construct the camera 1. Monitoring of the voltage of the battery 43 is performed in the power-supply control circuit 42.

A signal indicative of depression of the operating switch 10, etc., and a signal indicative of depression of the shutter-release button 3 are input to the CPU 20.

Emission of light from the strobe 5 is controlled by a strobe control circuit 28.

The CPU 20 controls drive of the imaging lens 2 by a lens driving circuit 24, drive of a diaphragm 21 by a diaphragm control circuit 25, drive of a shutter 22 by a shutter driving circuit 26 and drive on an image sensing device 23 by an image sensing device driving circuit 27.

If the camera mode has been set, a light image representing the image of a subject is formed on the image sensing device 23, such as a CCD, by the imaging lens 2. A video signal representing the image of the subject is output from the image sensing device 23 and input to an analog signal processing circuit 31, which subjects the video signal to prescribed analog signal processing such as a gamma correction. The video signal output from the analog signal processing circuit 31 is input to an analog/digital conversion circuit 32, which converts the analog video signal to digital image data. The digital image data is input to a digital signal processing circuit 33.

The digital signal processing circuit 33 subjects the digital image data to prescribed digital signal processing such as a white balance adjustment. The image data output from the digital signal processing circuit 33 is input to a display device 36 via a memory 34 and a signal processing circuit 35 for display purposes. The captured image of the subject is displayed on the display screen 17 (see FIG. 2) of the display device 36.

If the shutter-release button 3 is pressed, image data that has been output from the digital signal processing circuit 33 is stored in the memory 34 temporarily. The digital image data is read out of the memory 34 and input to a compression/expansion circuit 37, which proceeds to subject the entered image data to data compression processing. The compressed image data is applied to and recorded on a memory card 38.

In accordance with this embodiment, the digital still camera 1 with the DAP is capable also of playing back image data. If the playback mode is set by the power/mode switch 6, the compressed image data is read out of the memory card 38 and input to the compression/expansion circuit 37, where the compressed image data is subjected to data expansion. The expanded image data is applied to the display device 36 via the memory 34 and display signal processing circuit 35. The image represented by the image data that has been recorded on the memory card 38 is displayed on the display screen 17 of the display device 36.

If the memory card 38 has audio data recorded on it and the card 38 has been inserted into the digital still camera 1 with the DAP, the audio data recorded on the memory card 38 is read out and input to the CPU 20. The latter subjects the audio data to decoding processing. The decoded audio data is converted to an analog audio signal by a digital/analog conversion circuit 39. The analog audio signal is applied to the earphone jack 7. As a result, audio is output from an earphone that has been plugged into the earphone jack 7.

The circuits used in the photography (recording) camera mode are the circuits not indicated by hatching in the block diagram of FIG. 3. The circuits used in the playback camera mode are the circuits not indicated by hatching in the block diagram of FIG. 4. The circuits used in the DAP mode are the circuits not indicated by hatching in the block diagram of FIG. 5.

Figure 4:
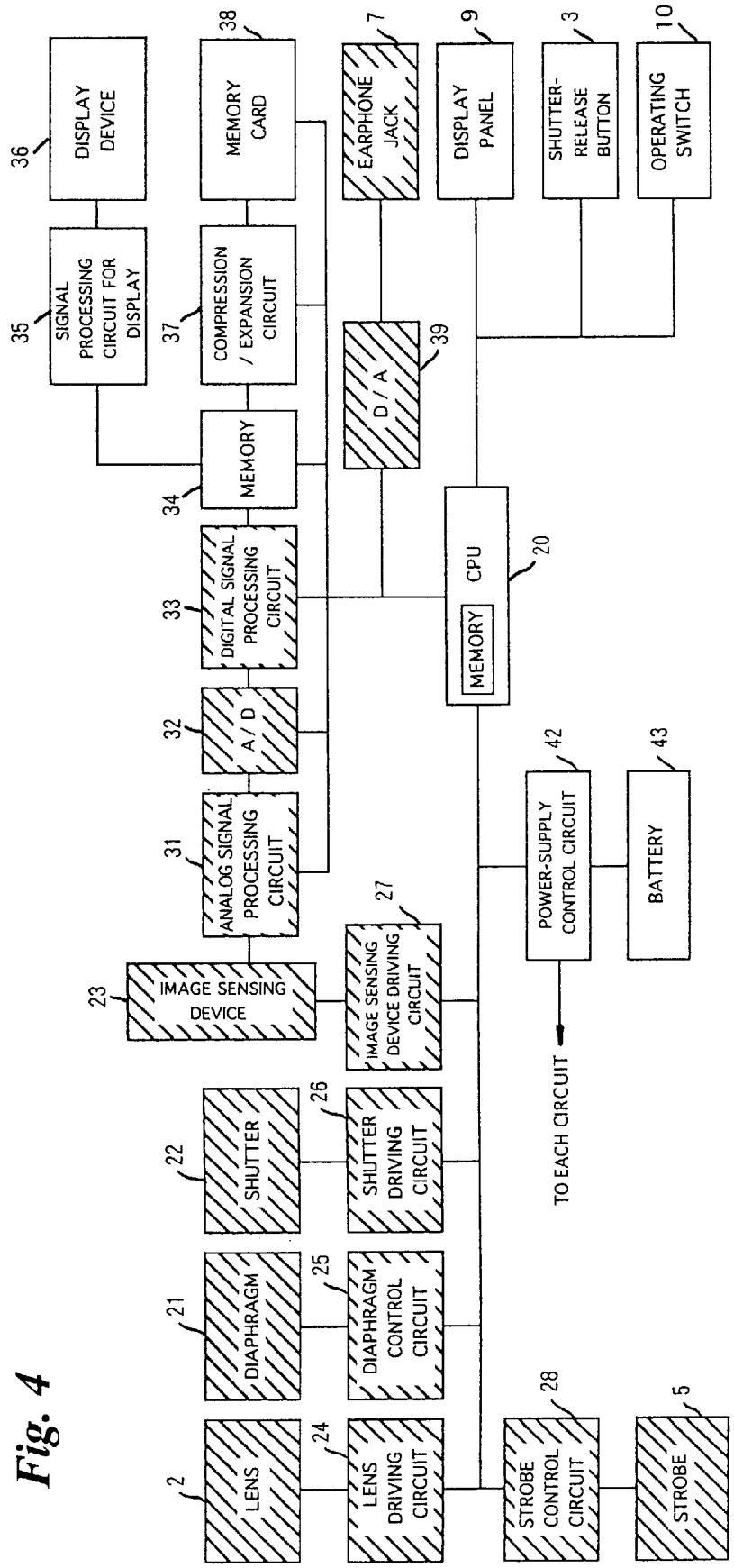
Figure 5:
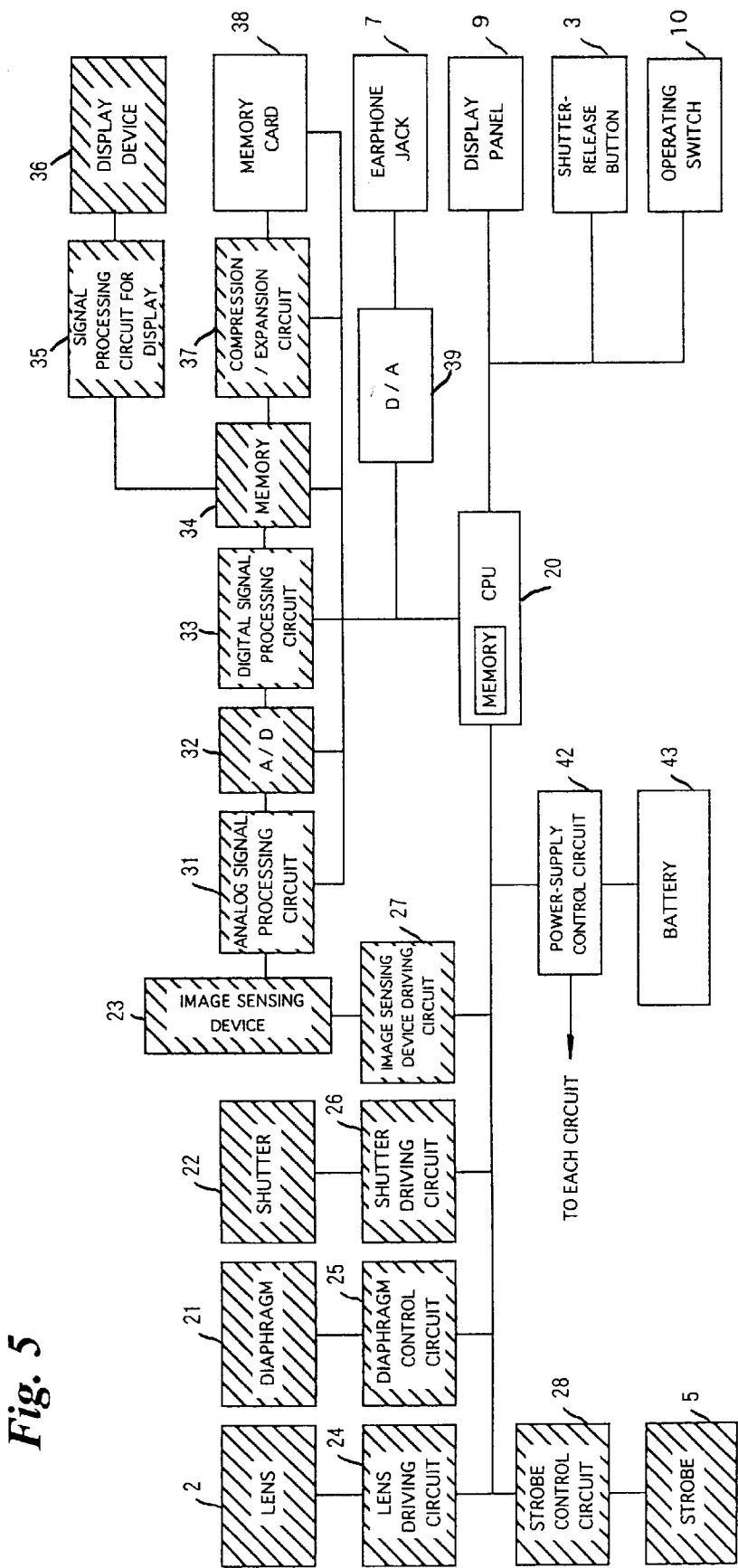

As will be understood from FIGS. 3 to 5, the circuits used in the camera mode at the time of playback are greater in number than the circuits is used in the DAP mode. Power consumed in the camera mode at playback, therefore, is greater than that consumed in the DAP mode. Further, the circuits used in the camera mode at the time of photography are greater in number than the circuits used in the camera mode at playback. Power consumed in the camera mode at the time of photography, therefore, is greater than that consumed in the DAP mode.

Figure 6:
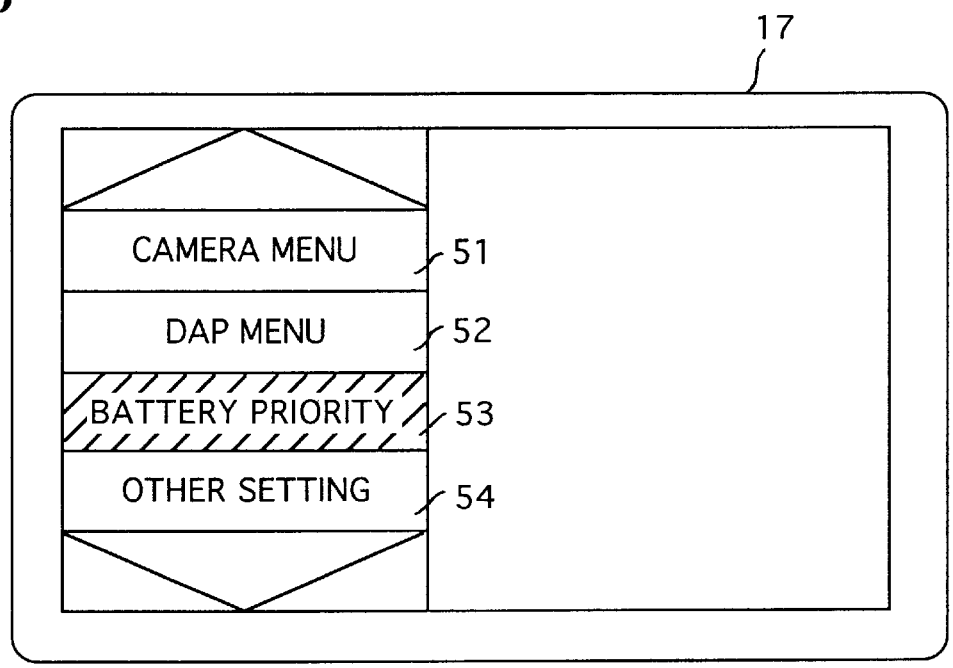
FIGS. 6 and 7 illustrate examples of images displayed on the display screen of the digital still camera.

FIG. 6 illustrates an example of the display screen 17 of the digital still camera 1 with the DAP.

Pressing the menu button 15 causes the image shown in FIG. 6 to be displayed on the display screen 17.

The display screen 17 includes an area 51 in which "CAMERA MENU" is displayed, an area 52 in which "DAP MENU" is displayed, an area 53 in which "BATTERY PRIORITY" is displayed, and an area 54 in which "OTHER SETTINGS" is displayed.

Figure 7:
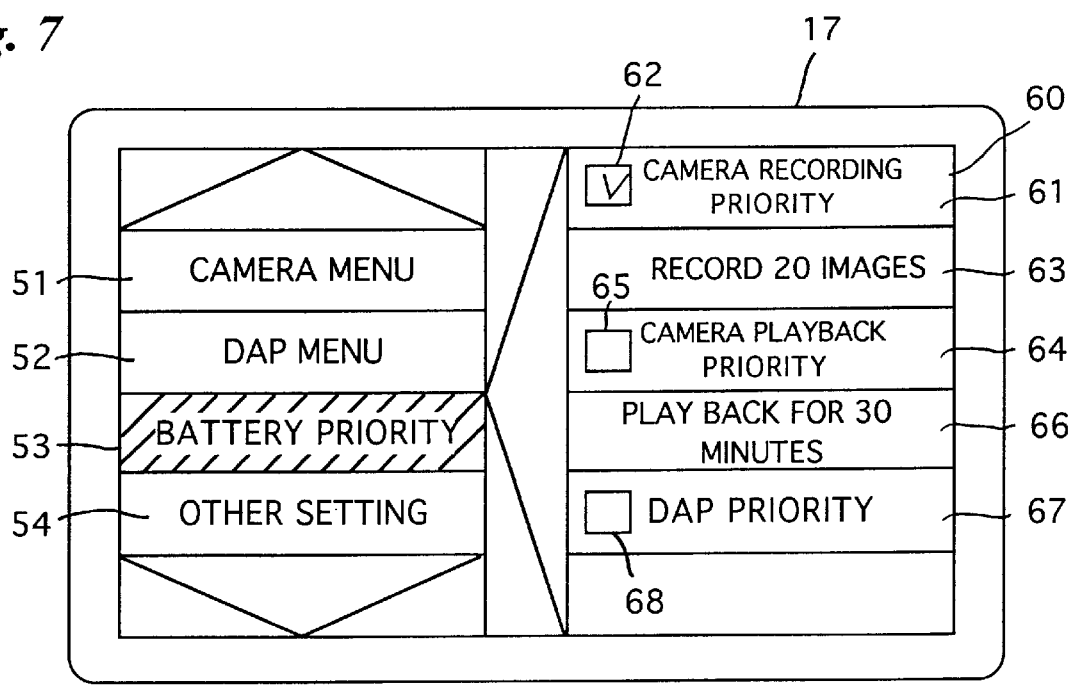

An area that has been selected is highlighted and therefore appears brighter than the other areas (this state is indicated by hatching in FIGS. 6 and 7). The highlighted area is shifted from the currently highlighted area to the area underlying the highlighted area by pressing the left-arrow portion 12 of the operating switch 10. The highlighted area is shifted from the currently highlighted area to the area above the highlighted area by pressing the right-arrow portion 13 of the operating switch 10. A submenu regarding the currently highlighted area is displayed on the display screen 17 by pressing the execute switch 16 (this is a setting to display the submenu).

When the digital still camera 1 with the DAP is used in the camera mode, a setting is made in such a manner that the submenu regarding the camera menu will be displayed. When the digital still camera 1 with the DAP is used in the DAP mode, a setting is made in such a manner that the submenu regarding the DAP menu will be displayed. Similarly, when the camera is used giving priority to the battery, a setting is made in such a manner that the submenu regarding battery priority will be displayed.

In the digital still camera 1 according to this embodiment, the voltage of the battery 43 is detected by the power-supply control circuit 42. As mentioned above, power consumption for operation of the digital still camera is greater than that for operation of the DAP. This means that even if the battery 43 has enough residual capacity for DAP operation, the digital still camera may not be able to operate. In the digital still camera 1 according to this embodiment, a threshold-value voltage in the camera mode at playback, a threshold-value voltage in the camera mode at the time of photography and a threshold-value voltage in the DAP mode are made different from one another. When priority is given to operation in the camera mode at playback, a warning is issued in response to a decline in voltage below the threshold-value voltage at which operation is possible in the camera mode at playback time. When priority is given to operation in the camera mode at the time of photography, a warning is issued in response to a decline in voltage below the threshold-value voltage at which operation is possible in the camera mode at the time of photography. When priority is given to operation in the DAP mode, a warning is issued in response to a decline in voltage below the threshold-value voltage at which operation is possible in the DAP mode. The mode for thus changing the threshold-value voltage in the camera mode at playback, the threshold-value voltage in the camera mode at the time of photography and the threshold-value voltage in the DAP mode is the battery priority mode. For example, if the execute switch 16 is pressed when the area 53 is highlighted, the display screen 17 changes over as shown in FIG. 7 to display a submenu 60 in order to make a setting in the battery priority mode.

The submenu 60 includes a camera-recording priority setting area 61, a camera-playback priority setting area 64 and a DAP priority setting area 67.

The camera-recording priority setting area 61 includes a check box 62. When a threshold-value voltage at which it is not possible to record image data representing the image of a subject is to be set in the camera mode, the user checks the check box 62. Underlying the camera-recording priority setting area 61 is an area 63 which displays the number of images of a subject desired to be recorded in the camera mode.

The camera-playback priority setting area 64 includes a check box 65. When a threshold-value voltage at which it is not possible to play back an image is to be set in the camera mode, the user checks the check box 65. Underlying the camera-playback priority setting area 64 is an area 66 which displays playback time in the camera mode.

The DAP priority setting area 67 includes a check box 68. When a threshold-value voltage at which it is not possible to reproduce sound is to be set in the DAP mode, the user checks the check box 68.

More specifically, if the right arrow 13 of the operating switch 10 is pressed, a check mark 69 moves among the check boxes 62, 65 and 68. The desired mode is set in response to pressing of the execute switch 16 by the user when a check mark is present in the desired check box.

When the check box 62 or 65 has been checked, it is possible to enter the number of images in the underlying area 63 or the playback time in the underlying area 66. The numerals displayed in the area 63 or 66 are incremented if the right arrow 13 of operating switch 10 is pressed, and the numerals displayed in the area 63 or 66 are decremented, if the left arrow 12 of operating switch 10 is pressed. The entered numerals are finalized by pressing the execute switch 16.

Figure 8:
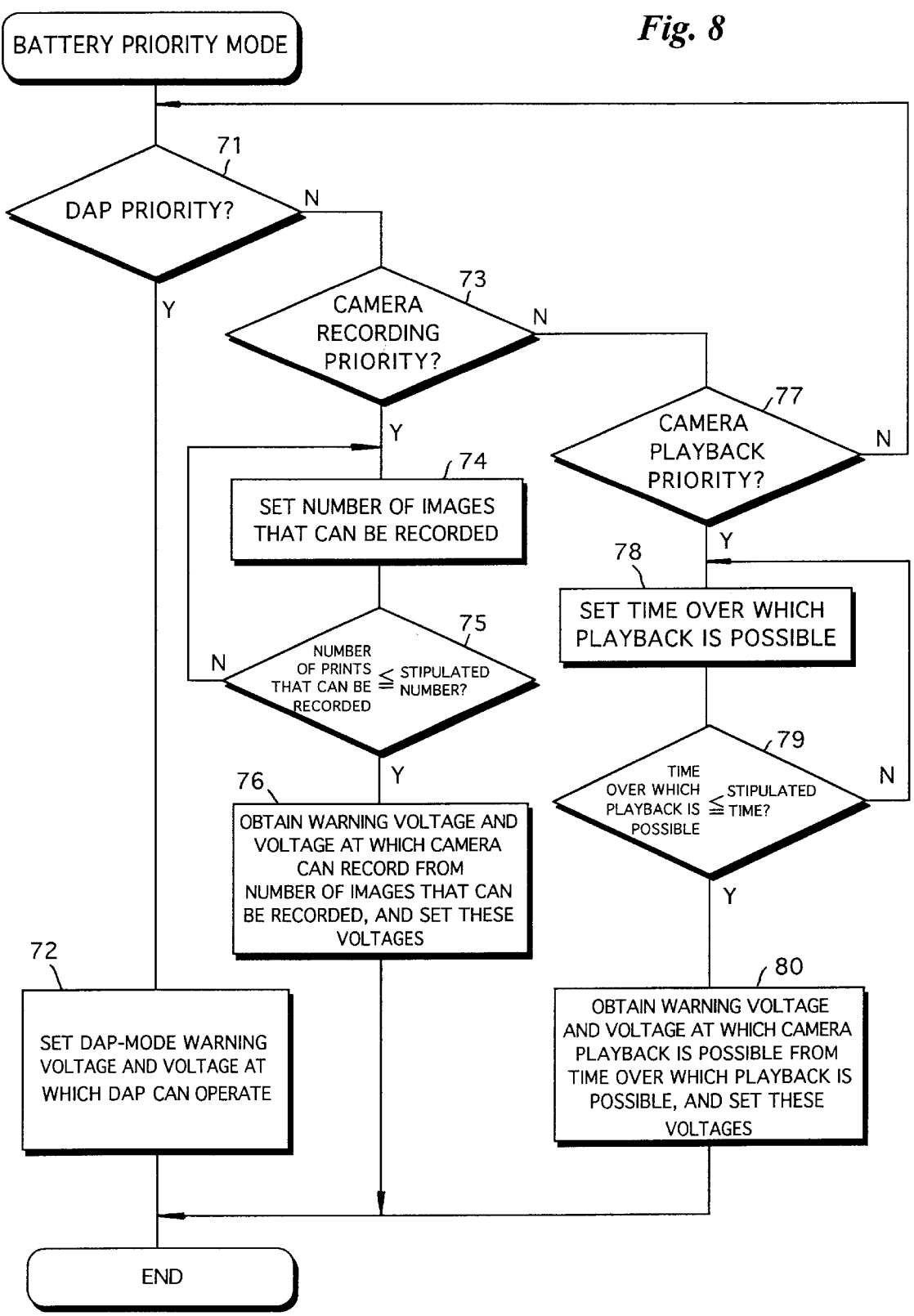
FIG. 8 is a flowchart illustrating processing in a battery priority mode.

FIG. 8 is a flowchart illustrating processing for setting the battery priority mode.

If the check box 68 is checked to set the DAP priority mode ("YES" at step 71), a warning voltage (threshold-value voltage) necessary for DAP operation and a voltage at which DAP operation is possible are set (step 72). The set warning voltage and voltage at which DAP operation is possible are stored temporarily in the memory within the CPU 20.

If the check box 62 is checked to set the camera-recording priority mode ("YES" at step 73), the number of images capable of being recorded is set by the user in the manner described above (step 74). It is determined whether the set number of images is equal to or less than a stipulated number of images that can be recorded on the memory card 38 (step 75). By way of example, the stipulated number of images is the maximum number of images that can be recorded on the memory card capable of being inserted into the camera 1. If the set number of images is equal to or less than the stipulated number of images ("YES" at step 75), the warning voltage and voltage at which the camera is capable of recording are calculated based upon the power necessary to record the set number of images that can be recorded. The calculated warning voltage and voltage at which the camera is capable of recording are stored temporarily in the memory within the CPU 20 (step 76).

If the check box 65 is checked to set the camera-playback priority mode ("YES" at step 77), the time over which playback is possible is set by the user in the manner described above (step 78). It is determined whether the set playback time is equal to or less than a stipulated time (step 79). For example, the stipulated time is a time over which audio data of the maximum quantity capable of being recorded on a memory card that can be inserted into the camera 1 is reproduced. If the set playback time is equal to or less than the stipulated playback time ("YES" at step 79), then the warning voltage and voltage at which camera playback is possible are calculated based upon the power necessary to play back images during the set playback time. The calculated warning voltage and voltage at which the camera playback is possible are stored temporarily in the memory within the CPU 20 (step 80).

Figure 9:
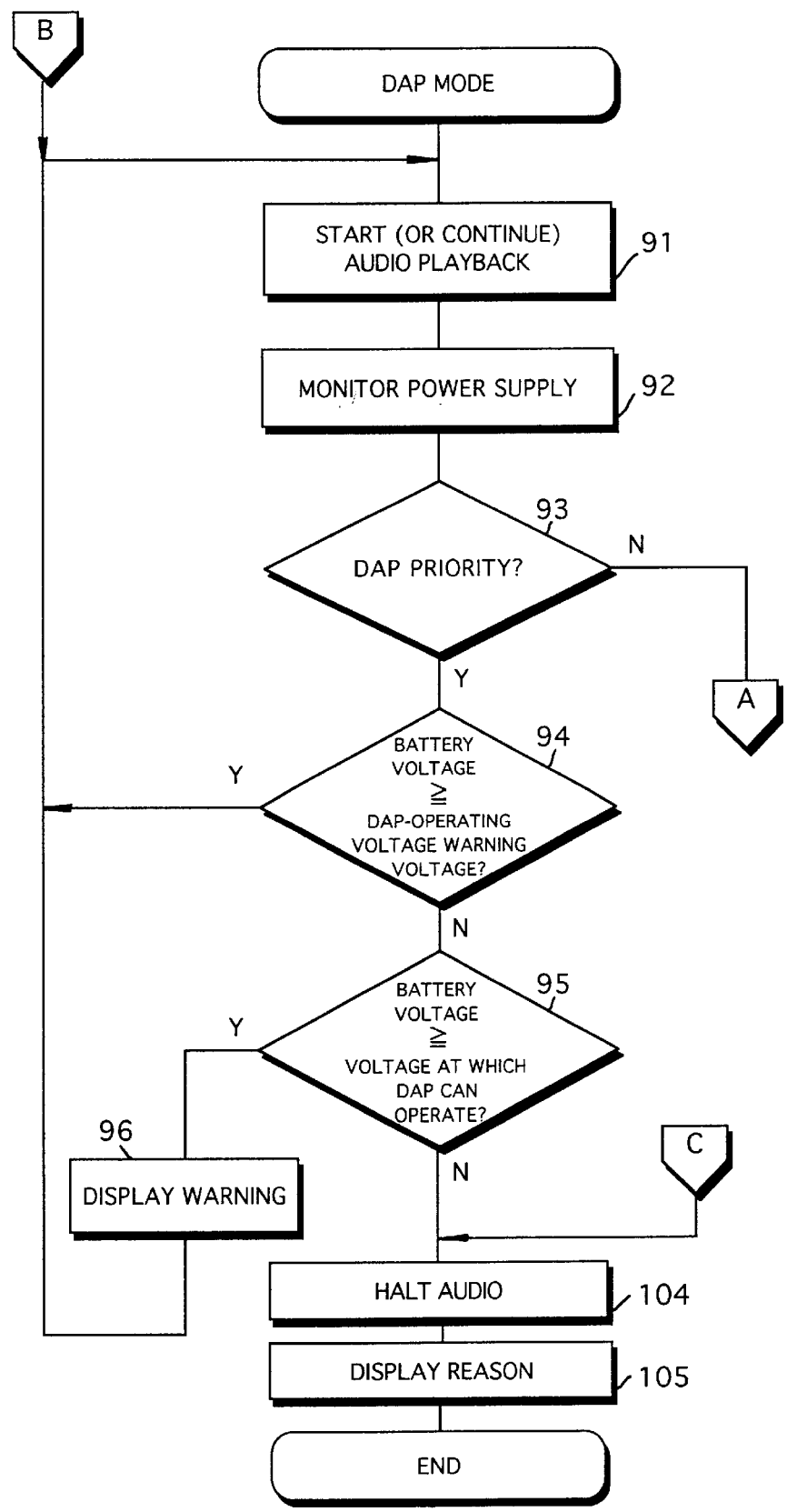
FIGS. 9 and 10 are flowcharts illustrating processing in a DAP mode.
Figure 10:
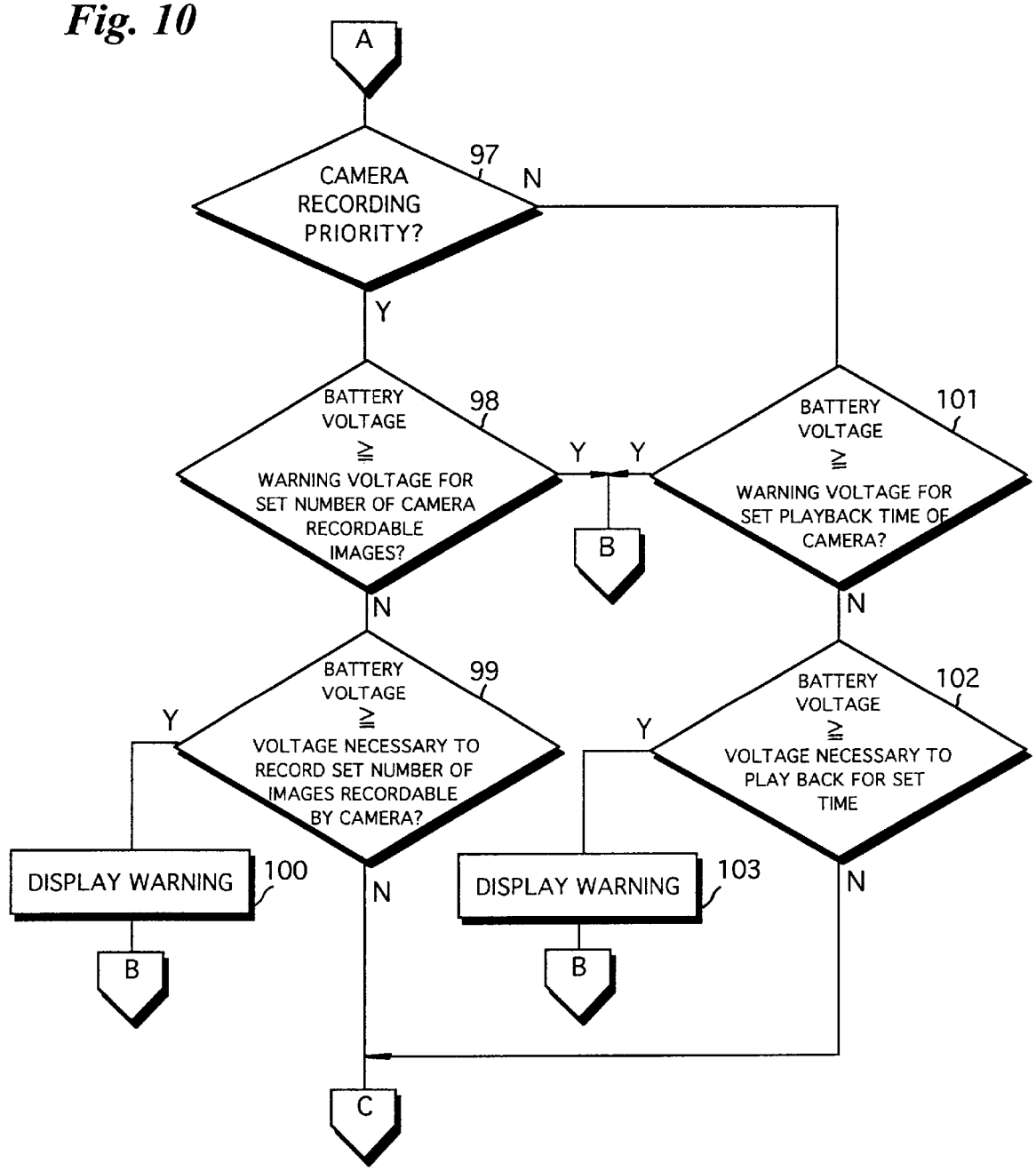

FIGS. 9 and 10 are flowcharts illustrating processing when the DAP mode has been set in the digital still camera 1 with the DAP function.

As described earlier, processing starts when the DAP mode is set by the power/mode switch 6.

Audio data that has been recorded on the memory card 38 inserted into the camera is read out of the memory card 38 and an audio signal is output from the earphone jack 7 (step 91). Further, monitoring of the voltage of the battery 43 at fixed time intervals starts in the power-supply control circuit 42 (step 92).

It is determined whether the DAP priority mode has been set (step 93). If the DAP priority mode has been set ("YES" at step 93), it is determined whether the voltage of battery 43 detected by the power-supply control circuit 42 is equal to or greater than the DAP-operation warning voltage (threshold-value voltage) (step 94). If the voltage of the battery 43 is less than the DAP-operation warning voltage ("NO" at step 94), it is determined whether the voltage of the battery 43 is equal to or greater than the voltage at which DAP operation is possible (step 95).

If, in a case where the voltage of the battery 43 is equal to or greater than the voltage at which DAP operation is possible ("YES" at step 95), reproduction of sound continues, then the capacity of battery 43 will decline and a display is presented on the display panel 9 to the effect that it may not be possible to reproduce sound much longer (step 96; "DISPLAY WARNING"). If the voltage of the battery 43 is less than the voltage at which DAP operation is possible, sound reproduction is halted (step 104). The reason for this, namely the fact that DAP operation cannot continue because the capacity of battery 43 has declined, is displayed on the display panel 9 (step 105).

If the DAP priority mode has not been set ("NO" at step 93), it is determined whether the camera-recording priority mode has been set (step 97). If the camera-recoding priority mode has been set ("YES" at step 97), it is determined whether the voltage of the battery 43 detected by the power-supply control circuit 42 is equal to or greater than the warning voltage that was set in the camera-recording priority mode (step 98). If the voltage of the battery 43 is less than the warning voltage ("NO" at step 98), it is determined whether the voltage of the battery 43 is equal to or greater than the voltage necessary to record a number of images equivalent to the recordable number that was set in the camera-recording priority mode (step 99).

If, in a case where the voltage of the battery 43 is equal to or greater than the voltage necessary to record a number of images equivalent to the recordable number ("YES" at step 99), reproduction of sound continues, then the capacity of the battery 43 will decline and a display is presented on the display panel 9 to the effect that it may not be possible to record images the number of which is equivalent to the set recordable number (step 100). If the voltage of the battery 43 is less than the voltage necessary to record the number of images equivalent to the recordable number, sound reproduction is halted (step 104). The reason for this (see FIG. 11), namely the fact that if operation of the DAP continues, it will not be possible to record images of the set recordable number because the capacity of the battery 43 has declined, is displayed on the display panel 9 (step 105). If it is desired to continue operation of the DAP, the battery 43 would be replaced.

If neither the DAP priority mode nor the camera-recording priority mode has been set ("NO" at steps 93 and 97), this means that the camera-playback priority mode has been set. It is determined whether the voltage of battery 43 detected by the power-supply control circuit 42 is equal to or greater than the warning voltage set in the camera-playback priority mode (step 101). If the voltage of battery 43 is less than the warning voltage ("NO" at step 101), then it is determined whether the voltage of the battery 43 is equal to or greater than the voltage necessary for playback for the length of playback time that was set in the camera-playback priority mode (step 102).

If, in a case where the voltage of the battery 43 is equal to or greater than the voltage necessary for playback for the set length of playback time, reproduction of sound continues, then the capacity of the battery 43 will decline and a display is presented on the display panel 9 to the effect that playback may not be possible for the set length of time (step 103). If the voltage of the battery 43 is less than the voltage necessary for playback for the set length of time, sound reproduction is halted (step 104). The reason for this, namely the fact that if operation of the DAP continues, image playback will not be possible because the capacity of the battery 43 has declined, is displayed on the display panel 9 (step 105).

Thus, even during operation of the DAP in the DAP mode, it is possible to leave enough voltage in the battery 43 to enable recording of the pre-set number of images or playback for the set length of playback time.

Though the foregoing embodiment deals with processing in the DAP mode, processing in the camera mode can be implemented in similar fashion. If image recording (or photography) is in progress in the camera recording mode or image playback is in progress in the camera playback mode, a warning would be issued in response to battery voltage falling below the set warning voltage, and the recording operation or playback operation would be suspended in response to the battery voltage falling below the set voltage at which operation is possible.

As many apparently widely different embodiments of the present invention can be made without departing from the spirit and scope thereof, it is to be understood that the invention is not limited to the specific embodiments thereof except as defined in the appended claims.

What is claimed is:

1. A warning device in a multifunction electronic apparatus driven by a removable battery and capable of first and second processing, comprising:
 a priority-processing setting unit for optionally setting which processing of the first and second processing is to be given priority;
 a detection unit for detecting voltage of the battery; and
 a warning unit for issuing a warning in response to detection, while processing is being carried out, by said detection unit of the fact that the voltage of the battery is in the vicinity of a voltage at which execution of the priority processing set by said priority-processing setting unit is impossible.

2. The device according to claim 1, further comprising a setting unit for setting a value relating to use time for executing the priority processing set by said priority-processing setting unit;

said warning unit issuing a warning in response to detection, while the first or second processing is being carried out, by said detection unit of the fact that the battery voltage has attained a voltage in the vicinity of a power-supply voltage necessary to execute priority processing of the value relating to use time set by said setting unit.

3. The device according to claim 1, further comprising a unit for halting supply of power by the battery in response to detection, while the first or second processing is being carried out, by said detection unit of the fact that the battery voltage attained a voltage at which it is not possible to execute the priority processing set by said priority-processing setting unit.

4. The device according to claim 1, said warning unit indicating a reason for the warning.

5. In a warning device of a multifunction electronic apparatus driven by a removable battery and capable of first and second processing, a warning method comprising the steps of:

optionally setting which processing of the first and second processing is to be given priority;

detecting power-supply voltage of the battery; and issuing a warning in response to detection, while the first or second processing is being carried out, of the fact that the voltage of the battery is in the vicinity of a voltage at which execution of the set priority processing is impossible.

6. A warning device in a multifunction electronic apparatus capable of a plurality of processing modes, comprising:

a priority-processing setting unit for optionally setting a processing mode to be given priority, wherein the plurality of processing modes that are not given priority are non-priority processing modes;

a detection unit for detecting voltage of a battery; and a warning unit for issuing a warning based on the priority processing mode selected and the voltage detected;

wherein, the warning issued warns of the fact that continued use of non-priority processing modes will render use of the priority processing mode impossible.

7. The device according to claim 6, further comprising a setting unit for setting a value relating to use time for executing the priority processing mode set by said priority-processing setting unit;

said warning unit issuing a warning, while a non-priority processing mode is being carried out, of the fact that the battery voltage has attained a voltage in the vicinity of a voltage necessary to execute the priority processing mode of the value relating to use time set by said setting unit.

8. The device according to claim 6, further comprising a unit for halting supply of power by the battery in response to detection, while a non-priority processing mode is being carried out, by said detection unit of the fact that the battery attained a voltage at which it is not possible to execute the priority processing set by said priority-processing setting unit.

9. The device according to claim 6, said warning unit indicating a reason for the warning.

10. In a warning device of a multifunction electronic apparatus capable of a plurality of processing modes, a warning method comprising the steps of:

optionally setting a processing mode to be given priority;

detecting voltage of a battery; and issuing a warning based on the priority processing mode selected and the voltage detected, wherein the warning warns of the fact that the voltage of the battery is in the vicinity of a voltage at which execution of the set priority processing mode is impossible.

* * * * *

UNITED STATES PATENT AND TRADEMARK OFFICE
CERTIFICATE OF CORRECTION

PATENT NO.    : 6,434,337 B1
DATED         : August 13, 2002
INVENTOR(S)   : Takeshi Misawa It is certified that error appears in the above-identified patent and that said Letters Patent is hereby corrected as shown below:

This certificate supersedes Certificate of Correction issued May 13, 2003, the number was erroneously mentioned and should be vacated since no Certificate of Correction was granted.

Signed and Sealed this

Twenty-fifth Day of November, 2003

JAMES E. ROGAN
*Director of the United States Patent and Trademark Office*